Sept. 29, 1964 C. J. STACY 3,151,204
MEASUREMENT OF FLUORESCENT MATERIALS
Filed Aug. 31, 1959 2 Sheets-Sheet 1

INVENTOR.
C.J. STACY
BY Hudson and Young
ATTORNEYS

Sept. 29, 1964  C. J. STACY  3,151,204
MEASUREMENT OF FLUORESCENT MATERIALS
Filed Aug. 31, 1959  2 Sheets-Sheet 2

INVENTOR.
C. J. STACY
BY Hudson & Young
ATTORNEYS

United States Patent Office 3,151,204
Patented Sept. 29, 1964

3,151,204
MEASUREMENT OF FLUORESCENT
MATERIALS
Carl J. Stacy, Bartlesville, Okla., assignor to Phillips Petroleum Company, a corporation of Delaware
Filed Aug. 31, 1959, Ser. No. 836,958
2 Claims. (Cl. 88—14)

This invention relates to improvements in method and apparatus for using polarized light, and in one embodiment for detecting fluorescent materials in fluid mixtures.

A "depolarization ratio" is used in studies to identify pure fluids, especially liquids, or to determine if a known fluid, particularly a liquid, is pure. This ratio is obtained by directing an incident beam of ultraviolet light into a sample cell filled with the fluid mixture and drawing a "scattered beam" of light out of the cell. This scattered beam is most commonly drawn out of the sample cell at 90 degrees to the input beam. The scattered beam is then polarized by passing it through a polarizing filter and lens to pass either the horizontal or vertical components thereof. The polarized scattered beam is then directed to a photoelectric cell, photomultiplier tube or other photosensitive device. This process is performed twice, once for each of the respective horizontal (H) and vertical (V) components of the scattered beam that impinge upon the photosensitive device. A computation of the depolarization ratio (the ratio $H/V$) is made from readings obtained of the photoelectric effect. This is then repeated at another wavelength. The two ratios can be used to identify the liquid if it is pure. If the identity of the liquid is known, but its purity is unknown, the depolarization ratio will indicate whether or not it is pure.

I have discovered that at short wavelengths, for example in the ultraviolet region, trace and small quantities of fluorescent materials drastically upset the depolarization ratio far beyond the amount thereof which may be present. Also, I have discovered that for many fluorescent materials the vertical components of the scattered light at various wavelengths are not affected nearly as much as are the horizontal components and that the horizontal components are those most affected by fluorescent materials. Accordingly, my invention includes the method of and apparatus for measuring and comparing the horizontal polarized scattered light at two different wavelengths. The wavelengths which are most suitable can be experimentally determined. By the practice of my invention it is possible to detect the presence and amount of fluorescent materials in mixtures, particularly in liquid mixtures, and even more particularly when only parts per million or a very low percent of these fluorescent materials are present. By the practice of my invention it is possible to obtain a continuous measurement and therefore it is possible to effect a continuous monitoring or control of a chemical or other process.

It is a principal object of my invention to provide an improved method and apparatus for studying materials by the use of polarized light. Another object is to provide an improved method and apparatus for detecting fluorescent materials in liquids by the use of polarized light. A further object of my invention is to provide an improved method and apparatus for detecting fluorescent materials in concentrations extending from trace quantities in the range of parts per million (p.p.m.) to about one percent. Still another object of my invention is to provide method and apparatus such as set forth in this paragraph which is suitable for making a continuous analysis for fluoroescent materials on a sample stream to bring about continuous monitoring thereof. Another object is to accomplish the foregoing objects by a novel use of horizontal polarized light. Other objects, advantages and features of this invention will become apparent from the following disclosure.

In the drawings.

Throughout the drawings the same reference number refers to the same element.

In a preferred embodiment, although not limited thereto, my invention is practiced by forming an incident beam of ultraviolet light of predetermined wavelength, passing it into a sample cell that contains the fluid to be analyzed, and directing a beam of scattered radiation from the sample cell through a polarizing lens to a photosensitive means. The polarizing lens is arranged to pass only horizontal components of the scattered beam. After the foregoing sequence of steps has been accomplished at one wavelength, they are repeated at a second wavelength. The outputs of the photosensitive means at each respective wavelength are then compared to give a ratio of the output at the lower wavelength ($H_L$) to the output at the higher wavelength ($H_H$) where outputs are those of the photosensitive means. According to one embodiment of my invention, both measurements at the respective wavelengths may be accomplished simultaneously. Tests on pure fluids, especially liquids, will reveal the response of the photosensitive means to them and such response can be used as a basis of comparison in other measurements. When different and greater responses are obtained, it is an indication of the presence of fluorescent materials. As compared with other analytical techniques, such as refractive index or infrared or ultraviolet absorption, the practice of my invention will detect smaller amounts of impurities, provided, of course, that they are fluorescent. In short, my improved method and apparatus is more sensitive than are the conventional techniques, as far as fluorescent materials are concerned.

Throughout this entire specification and the claims I use the term "fluorescence" in its technical sense. This may be defined as the production of radiation by a substance as a result of exposure to and absorption of other radiations of different wavelengths. Similarly, when I refer to fluorescent materials or the like, I refer to those materials having the property of fluorescence as just defined.

Figure 1:
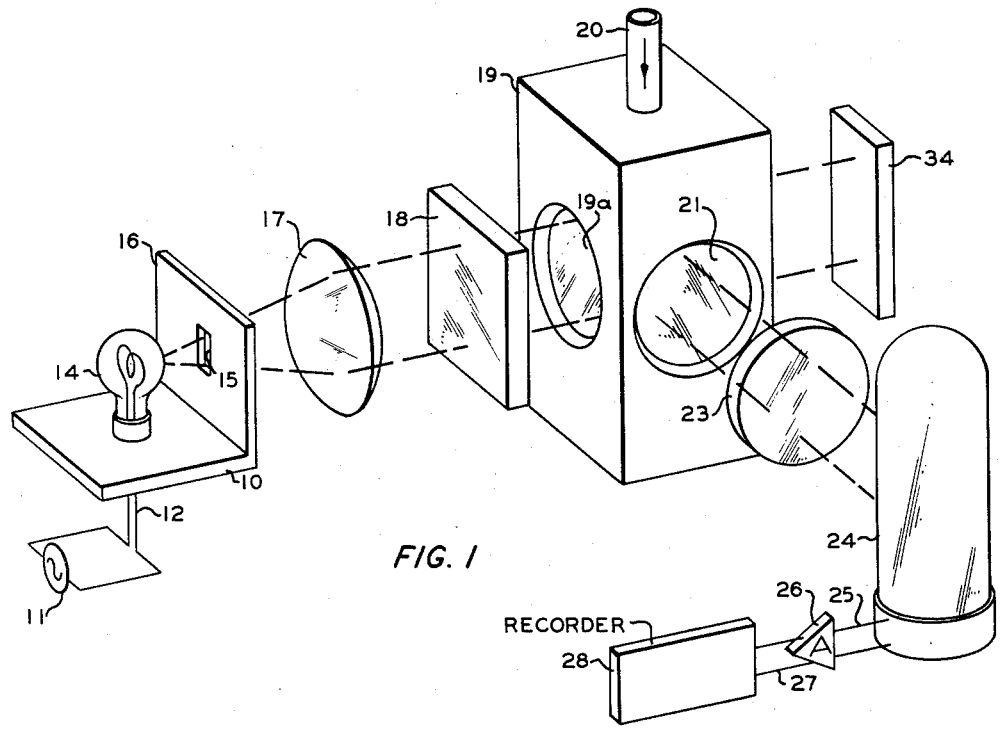
FIGURE 1 is an isometric schematic diagram of one embodiment of an apparatus for the practicing my invention.

In FIGURE 1 is shown a schematic arrangement of elements which is suitable for employment as a laboratory instrument or for manually taking intermittent or discontinuous measurements according to my invention. In the preferred form of this embodiment, the optical system illustrated in FIGURE 1 is mounted on a base 10 (which is not completely shown for the sake of clarity) and power is supplied thereto from a source 11 through leads 12 to a radiation source 14, which preferably produces visible and/or ultraviolet radiation, and may comprise a mercury vapor lamp. A beam of incident radiation is directed from the source 14 through a slit 15 in opaque shield 16. A collimating lens 17 and a filter 18 are disposed in the incident beam which is directed into a sample cell 19 through incident beam window 19a. The sample cell has windows constructed as described with respect to FIGURE 3 below.

The filter 18 may be of conventional construction and is designed to cooperate with radiation source 14 to pass only wavelengths of a predetermined magnitude. In the examples below, wavelengths in the visible range of 4358 and 4050 Angstrom units and of 5460 Angstrom units (A) were directed into the sample cell. In the embodiment of FIGURE 1, two filters 18 are employed, one for each predetermined wavelength, and are manually interchanged.

The sample cell 19 has a sample inlet 20 connected thereto. Samples may be manually placed in the cell through this inlet. An outlet, not shown, is similarly disposed in the bottom of the cell for the removal of samples. A valve should be connected to this outlet so that opening and closing of it will drain the sample cell. If desired, the inlet 20 may be connected through a sample line to a source of the material to be analyzed and by manipulating the valve on the outlet line samples can be admitted to the sample cell as desired.

The sample cell has a scattered light window 21 which is located preferably at 90 degrees to the incident beam. The scattered beam formed by the window 21 is first passed through a polarizing lens 23 and then to a photosensitive means 24. The polarizing lens 23 may be made of tourmaline crystal and is arranged to pass only the horizontal component of the light. Preferably, it should be selected to pass the maximum amount of horizontal light at the wave length of the scattered beam. In the practice of my invention, the horizontal component is a minor proportion of the scattered beam from a pure liquid. However, the amount of fluorescence in the sample will greatly increase this proportion. The photosensitive means 24 may be a photomultiplier tube, a photoelectric cell or other means that generate an electrical response to light impinging thereon.

Signals generated in the photosensitive means 24 are transmitted through leads 25 to an amplifier 26. The amplifier may be an optional feature and if the signals produced in 24 are strong enough it may be eliminated. Normally, however, the amplifier will be required. Since the signals produced by the photomultiplier tube will be of direct current (D.C.), the amplifier 26 should comprise a D.C. amplifier, but its output can be either A.C. or D.C. according to the type of indicating means 28 that is employed. The output from the amplifier is applied to the indicator via a pair of leads 27. The indicating means 28 may comprise an electrical recorder, a galvanometer, or other means known to the art for sensing and presenting the output of the photosensitive means 24.

If desired, the photomultiplier tube can be connected in a circuit to compensate for variations in the intensity of the light source 14. Such a circuit is shown in the United States patent to Peterson, No. 2,565,265 and further includes a D.C. power supply, voltage regulator, and provides a D.C. output signal to a galvanometer, vacuum tube meter, or other current measuring device.

Alternatively, should an A.C. output signal be desired, the circuit including the tube 24, amplifier 26, and recorder or other intensity meter 28 may be connected in the manner taught in the United States patent to Fromm, No. 2,707,238. Other circuits directed to this end are taught in the patents cited in the specification of Fromm and while having limitations, may also be used.

It is to be understood that the above-cited patents are only illustrative of the various types of circuits which can be employed to effect the connections and purposes herein set forth and that other equivalent means known to the art can be employed to the same ends.

In operating the embodiment of FIGURE 1, a sample is first placed in the sample cell 19. As mentioned above, this can be accomplished either by manually pouring in a sample through the inlet 20 or by manipulating a valve connected to an outlet, not shown, which will in turn admit samples from a source of the material to be analyzed. The incident beam formed by the radiation source 14 is then directed through the lens 17 and filter 18 into the sample cell through the window 19a. A window, not shown, similar in structure to 19a may be aligned therewith to direct the transmitted beam onto a target 34. The target may either be a black body to absorb all of the transmitted radiation or it may be a photosensitive means plus suitable circuitry to enable other and different studies of samples than my invention includes, e.g. turbidity studies.

The scattered beam formed by internal reflections within the sample is then directed out of the sample cell through the polarizing lens 23 to impinge on the photosensitive means 24 which produces a signal responsive thereto. This process of passing an incident beam into the sample cell and drawing therefrom a scattered beam to obtain a photoelectric response is first performed employing a scattered beam of a predetermined wavelength (e.g. 4050 A.) and then is again repeated at another and different wavelength (e.g. 5460 A.). These wavelengths are determined by the nature of the filter 18. In both cases the horizontal portion of the scattered beam is passed from the polarizing filter 23 to the means 24.

For the sake of convenience in construction the indicating means 28 should not be mounted on the base 10 but appropriate electrical jacks or other connections can be provided to achieve the connection between the optical system that is mounted on base 10 and the means 28.

Figure 2:
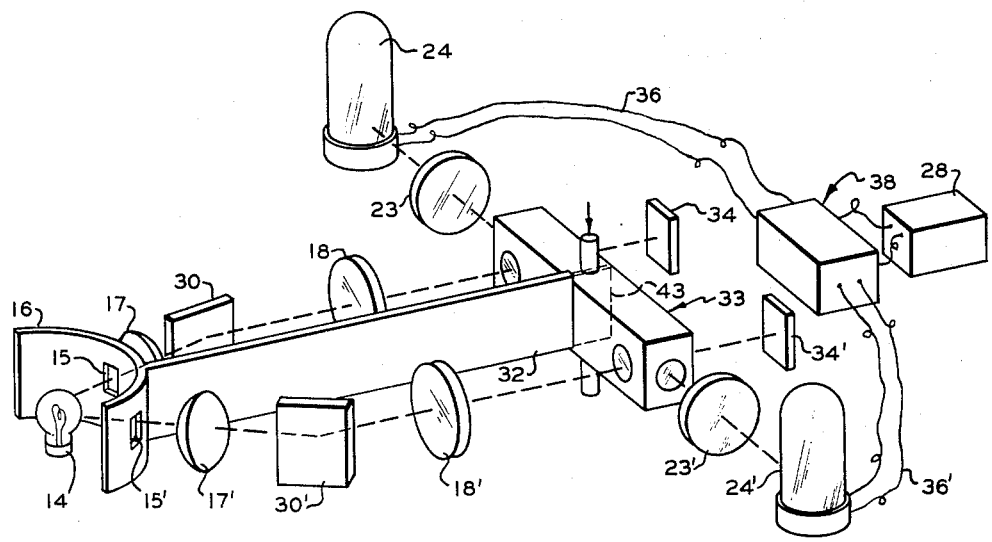
FIGURE 2 is an isometric schematic view of another embodiment of the invention that is suitable for continuous measurements on a sample stream.

In FIGURE 2 is shown an embodiment for accomplishing the measurements at the different wavelengths simultaneously. An advantage in so doing is realized in that continuous monitoring or control can be obtained by the simultaneous measurements. The apparatus of FIGURE 2 also provides for comparing these measures to automatically provide a ratio of the polarized light at the lower wavelength to that of the higher wavelength. In FIGURE 2 unprimed numbers are employed to illustrate the apparatus used for forming one incident beam and one scattered beam of a predetermined wavelength and corresponding primed numbers are employed to represent the apparatus employed for the other beam which is of different wavelength. Apparatus that is like that of FIGURE 1 will not be further discussed, but only that having differences will be discussed. As with FIGURE 1, visible or ultraviolet light is used.

A mirror 30, 30' is disposed in each beam, preferably between the collimating lens and the filter in order to direct the incident beam into the sample cell. The sample cell of FIGURE 2 will be described with respect to FIGURE 3. Between the two incident beams is disposed a light splitting shield 32 which is an opaque member and serves to prevent radiations from one beam from affecting the other beam. As shown by the dotted lines in the figure, within the sample cell each incident beam is split into a scattered beam and is also split into a transmitted beam which is directed onto a target 34, 34' which absorbs the light.

The electrical circuit of FIGURE 2 differs from that of FIGURE 1 by being designed to provide an output signal representative of the ratio of the two different polarized scattered light beams. In the practice of my invention this ratio is that of the horizontal component of the beam of lower wavelength to that of the horizontal component of the scattered light from the incident beam of higher wavelength. This is accomplished by connecting, via respective leads 36, 36' photosensitive means 24, 24' to a servo-driven potentiometric divider 38. Such a divider is described on pages 73 and 74 of "Analog Methods in Computation and Simulation" (1945), McGraw-Hill, N. Y., by W. W. Soroka (hereinafter "Soroka") and is suitable for dividing two variables. Other means, mechanical, electrical, electronic, or a combination thereof, are also described by Soroka, and those which can continuously divide two continuously varying variables are also suitable, although one may be preferred according to speed of response, accuracy, availability, cost, or the like. The circuits on pages 73-74 of Soroka require an A.C. input, therefore means to convert the D.C. output of the tubes 24, 24' to A.C. should be included in the circuit between the tube and the divider; such means could include, for example, a transformer and solenoid operated chopper, or the circuitry of the above-cited Fromm patent.

It should be evident that the entire optical system of both FIGURES 1 and 2 should be disposed within a light tight case in order to assure that only radiations of the predetermined wavelength are directed into the sample cell. The case is not shown as it is of conventional construction and of conventional materials. The primary requisite of the case is that it be opaque and light tight. Electrical connections can be disposed in the case and the case can be attached to the base 10.

Figure 3:
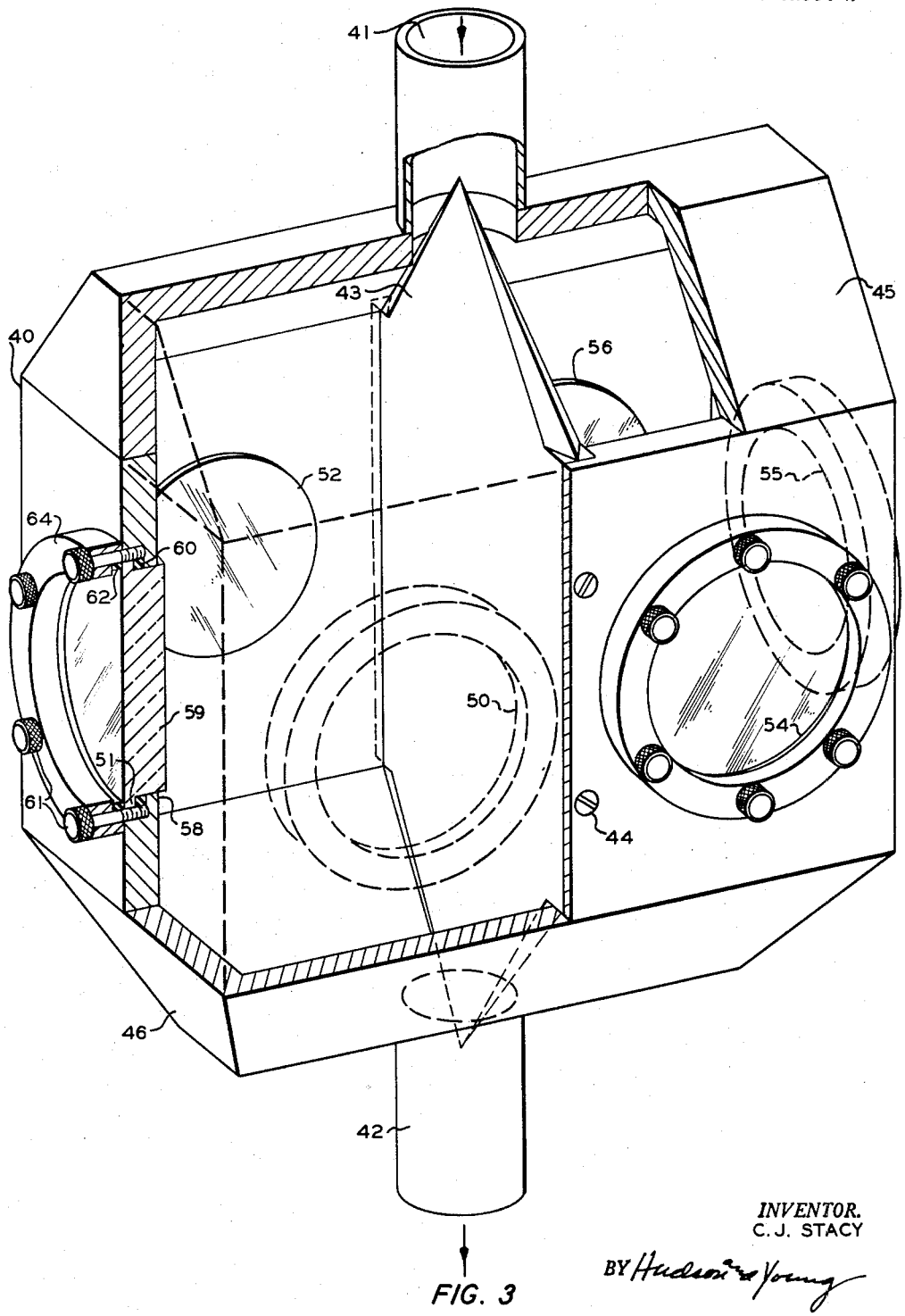
FIGURE 3 shows details of construction of the sample cell.

FIGURE 3 shows the details of the sample cell 33. In addition, the window construction illustrated in FIGURE 3 is eminently suitable for the sample cell 19 of FIGURE 1.

A body member 40 supports the windows and inlet and outlet members hereinafter described. The body member and the window construction are designed to be fluid tight and light tight and both should be constructed of materials which do not chemically react with the substances to be analyzed, for example the body of brass or stainless steel and the windows of clear optical quality glass.

An inlet 41 and an outlet 42 are connected, respectively, to the top and bottom sections 45 and 46 of the sample cell in order to pass a sample stream continuously therethrough. The path of the sample stream should preferably be at right angles to the planes of the light beams that pass through the windows of the sample cell. A stream splitter 43 is secured within the sample cell as by bolts 44 or by suitable welding or brazing in order to split the incoming stream into two portions and to direct each portion through a path past the set of windows which subjects it to the incident beam and withdraws therefrom the transmitted and scattered beams. It is preferable that the stream splitter and internal configuration of the sample cell be designed to maintain approximately a constant velocity through the sample cell, e.g. the cross-sectional area of the path should be approximately constant. The function of the stream splitter is thus seen to be split the sample stream into two substantially equal portions, to direct each into an analyzing chamber where it flows past the windows, and then to flow the two streams back into each other.

The stream splitter, of course, should be opaque and should be light tight in its connections to the body 40 and to the top and bottom sections so that there will be no chance of radiation from one side affecting the radiations being applied to the split sample stream on the other side of the cell. In the drawing are shown grooves which serve both purposes.

The inlet and outlet sections 45 and 46 of the body member 40 should be conformed so that the inlet section is faired into the window section to provide a smooth path of flow. These sections are sealingly connected as by gaskets (not shown) to the body 40. For ease of assembly flanges on the body and each section, nuts and bolts, not shown, can be used to complete the connection between the respective sections and the body.

In the body 40 are fashioned a plurality of sets of window openings, 50, 51 and 52 and 54, 55 and 56. The openings 50 and 52 are aligned with each other so that the incident beam can enter one opening and the transmitted beam leave from the other opening. The window 51 is disposed to receive the scattered beam at 90 degrees to the line formed by the incident and transmitted beam as it passes between windows 50 and 52. The windows 50, 51 and 52 form the set of windows for one analyzing chamber. The windows 54, 55 and 56 are disposed in the same relationship to each other as is the set of windows 50, 51 and 52, respectively, and form the set for the other analyzing chamber.

The window constructions are all similar and will now be described with respect to the embodiment shown in FIGURE 3. There are various window constructions known to the art, however, the one I have illustrated is my preferred embodiment. Each window opening is machined so that a shoulder 58 is provided. The window 59 is fashioned so that it presents a T cross section when viewed along a dimetral cross section so that a shoulder of a window can engage the gasket 60 to seat on the shoulder 58. This provides a fluid-tight seal. The T shape of the window permits the face thereof to extend into the body far enough to be approximately flush with the inner face thereof. This assures that the continuous incoming sample stream always sweeps by the window. The gasket 60 should be non-reactive with materials to be analyzed, and, where hydrocarbons are under analysis, it may be formed from neoprene, "Teflon," or one of the silicone rubbers.

In order to secure the window 59 in its opening there is provided a securing ring 64 which is held in place by a plurality of bolts 61. A second gasket 62 which can be of similar construction and materials as 60 is provided to insure even seating of the ring 64 upon the window. The window is secured in fluid tight relationship in the body 40 by pulling down on the bolts 61 a sufficient degree. Caution should be exercized to make sure that the bolts 61 are all pulled down evenly so that there is an even pressure around the circumference of the window.

The sample cell 19 for FIGURE 1 can be constructed similarly to that shown for FIGURE 3, but would only need to include one set of windows and could omit the stream splitter.

FIGURE 2 operates in a generally similar fashion to that of FIGURE 1. Incident beams, each of a different wavelength, are directed from the source 14 through the filters 18 and 18' to their respective sides of the sample cell 33. The scattered light from each beam is then passed through the respective polarizing filters 23 and 23' and impinges upon the respective photosensitive means 24 and 24'. The signals produced in 24 and 24' are then fed into the electrical circuit 38 which automatically computes the ratio of $H_L/H_H$ (or the ratio $H_H/H_L$ if desired) and produces an output signal representative of this ratio and it is this ratio that is recorded on recorder or indicator 28.

The following examples illustrate results obtainable in the practice of my invention:

*Example I*

RESEARCH GRADE BENZENE [1] SAMPLE

| Wave length | 4358 A. | 5460 A. | Ratios | |
|---|---|---|---|---|
| | | | $H4358/H5460$ | $V4358/V5460$ |
| H | .0049 | .0014 | 3.5 | 2.4 |
| V | .0091 | .0038 | | |
| H/V | .54 | .37 | | |

RESEARCH GRADE BENZENE AFTER FRESH DISTILLATION

| H | .0032 | .0015 | 2.1 | 2.0 |
|---|---|---|---|---|
| V | .0075 | .0038 | | |
| H/V | .43 | .40 | | |

[1] Described in "Phillips 66 Hydrocarbons Catalog" (1954), 4th ed., publ. Phillips Petroleum Co.

Disagreement at two wavelengths (.54, .37) and high value for 4358 A. (.54) when compared with literature (.41, .40) (Carr & Zimm, J. Chem. Physics 18, 161

(1950) indicates fluorescence due to a removable impurity.

Note that after distillation H/V at 4358 A. dropped 20%; H/H dropped 38% as V/V decreased only 17%.

*Example II*

RESEARCH GRADE TOLUENE[1] SAMPLE

| Wave length | 4358 A. | 5460 A. | Ratios | |
|---|---|---|---|---|
| | | | $H_L/H_H$ | $V_L/V_H$ |
| H | .0072 | .0022 | 3.3 | 2.5 |
| V | .0113 | .0046 | | |
| H/V | .64 | .48 | | |

FRESHLY DISTILLED RESEARCH GRADE TOLUENE

| H | .0041 | .0019 | 2.16 | 2.0 |
|---|---|---|---|---|
| V | .0081 | .0041 | | |
| H/V | .50 | .46 | | |

[1] Described in "Phillips 66 Hydrocarbons Catalog" (1945), 4th ed., publ. Phillips Petroleum Co.

Literature values average 0.49 for both wavelengths.

Note that H/H decreased 33% as V/V dropped only 20% after distillation.

*Example III*

Sample:                    H (4050 A.)/
                                        H (5460 A.)

(a) "Spectro Grade" cyclohexane[1] _____ 2
(b) 7.14 p.p.m. anthracene in (a) above ____ 7.1
(c) 4.43 p.p.m. anthracene in (a) above ____ 4.4
(d) 2.4% cyclohexanone in (a) above _____ 7.6
(e) .036% "Fine Parts Oil" in (a) above ____ 14.4
(f) .0024% "Fine Parts Oil" in (a) above ___ 3
(g) freshly distilled acetone[2] _____ 1.1
(h) .031% "Fine Parts Oil" oil in acetone ____ 3

[1] Described in "Phillips 66 Hydrocarbons Catalog" (1954), 4th ed., publ. Phillips Petroleum Co.
[2] "Acetone, Reagent—Merck" as defined in "The Merck Index (5th ed.)," publ. (1940) by Merck & Co., Inc., Rahway, N.J.

The two analyses of anthracene in spectrometer grade cyclohexane illustrate that measuring the horizontal components by my process is sensitive to the amount of fluorescent materials present, even in trace quantities in the region of parts per million. Similar results were obtained in the measurements of "Fine Parts Oil" in cyclohexane. The wave lengths of these Example III studies were 4050 Angstrom (A.) and 5460 Angstrom (A.).

Distillation to get the freshly distilled samples was accomplished using glass laboratory apparatus with no rubber stoppers, tubes, or greasy joints. The liquid was an aliquot portion of the benzene, toluene, or acetone, having been taken from the same bottle. It was boiled slowly in a flask and the vapors passed through 7 inches of a Vigreaux column, condensed, and collected in sample cell. A dust cover was provided on the sample cell during distillation. The first 5 to 10% of the liquid recovered as a condensate was discarded, the next 60 to 70% was recovered in the sample cell. The liquid in the flask was not completely evaporated.

Several structural modifications are possible in the case of FIGURE 2. For example, two different sources 14 could be employed and thus eliminate having to use mirrors 30 and 30'. Also, two individual sample cells could be employed instead of the stream splitting construction shown in FIGURES 3 and 4. However, this would require that appropriate T connections or Y connections be provided up and downstream of the sample cells. Also, the polarizing lenses 23 and 23' could be turned to pass horizontal and vertical light, respectively, and the depolarization ratio automatically computed by 38.

In analyses for trace components present in another material, it may be desirable to adjust the electrical system so that the readings do not take into effect the fluorescence of the major component. This may be done by using two separate analyzing chambers, one with a known composition (pure, or impure with known type and amount of impurities therein) sealed therein, and the other being connected to the sample stream. In this case, a bridge circuit like those in U.S. Patent No. 2,845,585 or 2,857,799 to Simmons and Miller et al., respectively, is used to provide an output signal representative of this comparison.

Among uses of my invention is the analysis of drilling muds to detect the arrival of a well drilling operation in oil bearing strata, as taught in the U.S. patents to Doan, No. 2,288,942. Another application is to analyze waters that flow underground in order to trace their flow as is taught in U.S. Patent 2,553,900 to Doan et al. Still another application is the analysis of hydrocarbon solvents that are employed in chemical processes. For example, such solvents could be analyzed for the buildup of trace impurities such as sulfur which might poison catalysts, e.g. to monitor the sulfur content of the solvents employed in the process taught in U.S. Patent 2,825,721 issued to J. P. Hogan et al. Still another application is to detect trace amounts of fluorescent impurities which may be present in what are termed "Research Grade" or "Spectro Grade" chemicals, particularly organic solvents of "Research" or "Spectro Grade" purity. Chemicals of this grade are of extremely high purity and even trace quantities of impurities must be known if accurate results are to be obtained in all instances in the laboratory. The known degree of purity is particularly important where various optical and spectrographic processes are being employed to analyze such materials, chemicals dissolved therein, or where such Research Grade materials are employed as standards for measuring other substances.

While I have described my invention with respect to certain embodiments and examples, it is to be understood that I do not intend to limit my invention thereto but to include all the modifications thereof that are within the spirit of this invention and which would be obvious to one skilled in the art.

I claim:

1. A method for detecting the presence of fluorescent materials in a fluid which comprises passing a first radiation beam of a first wavelength into a sample of the fluid to be measured; measuring a first component of a resulting second radiation beam emitted from said sample by fluorescent materials therein receiving said first beam, which first component vibrates solely in the plane formed by said first and second beams; passing a third radiation beam of a second wavelength different from said first wavelength into said sample; and measuring a second component of a resulting fourth radiation beam emitted from said sample by fluorescent materials therein receiving said third beam, which second component vibrates solely in the plane formed by said third and fourth beams, thereby providing two measurements which, when compared, provide an indication of fluorescent materials in said fluid.

2. A method for detecting the presence of fluorescent materials in a fluid which comprises passing a first radiation beam of a first wavelength into a sample of the fluid to be measured; measuring a first component of a resulting second radiation beam emitted from said sample by fluorescent materials therein receiving said first beam, which first component vibrates solely in the plane formed by said first and second beams; passing a third radiation beam of a second wavelength different from said first wavelength into said sample; measuring a second component of a resulting fourth radiation beam emitted from said sample by fluorescent materials therein receiving said third beam, which second component vibrates solely in the plane formed by said third and fourth beams; and measuring the ratio of said first and second components.

(References on following page)

References Cited in the file of this patent

UNITED STATES PATENTS

| | | |
|---|---|---|
| 1,717,702 | Exton | June 18, 1929 |
| 1,755,834 | Marr et al. | Apr. 22, 1930 |
| 2,403,631 | Brown | July 9, 1946 |
| 2,436,262 | Miller | Feb. 17, 1948 |
| 2,459,512 | Fash et al. | Jan. 18, 1949 |
| 2,554,321 | Bray | May 22, 1951 |
| 2,761,067 | Troy | Aug. 28, 1956 |
| 2,829,555 | Keston | Apr. 8, 1958 |
| 2,858,727 | Stamm et al. | Nov. 4, 1958 |
| 2,971,429 | Howerton | Feb. 14, 1961 |

FOREIGN PATENTS

| | | |
|---|---|---|
| 813,579 | Great Britain | May 21, 1959 |

UNITED STATES PATENT OFFICE
CERTIFICATE OF CORRECTION

Patent No. 3,151,204

September 29, 1964

Carl J. Stacy

It is hereby certified that error appears in the above numbered patent requiring correction and that the said Letters Patent should read as corrected below.

Column 8, line 47, for "relation" read -- radiation --.

Signed and sealed 2nd day of March 1965.

(SEAL)
Attest:

ERNEST W. SWIDER
Attesting Officer

EDWARD J. BRENNER
Commissioner of Patents